Patented June 15, 1965

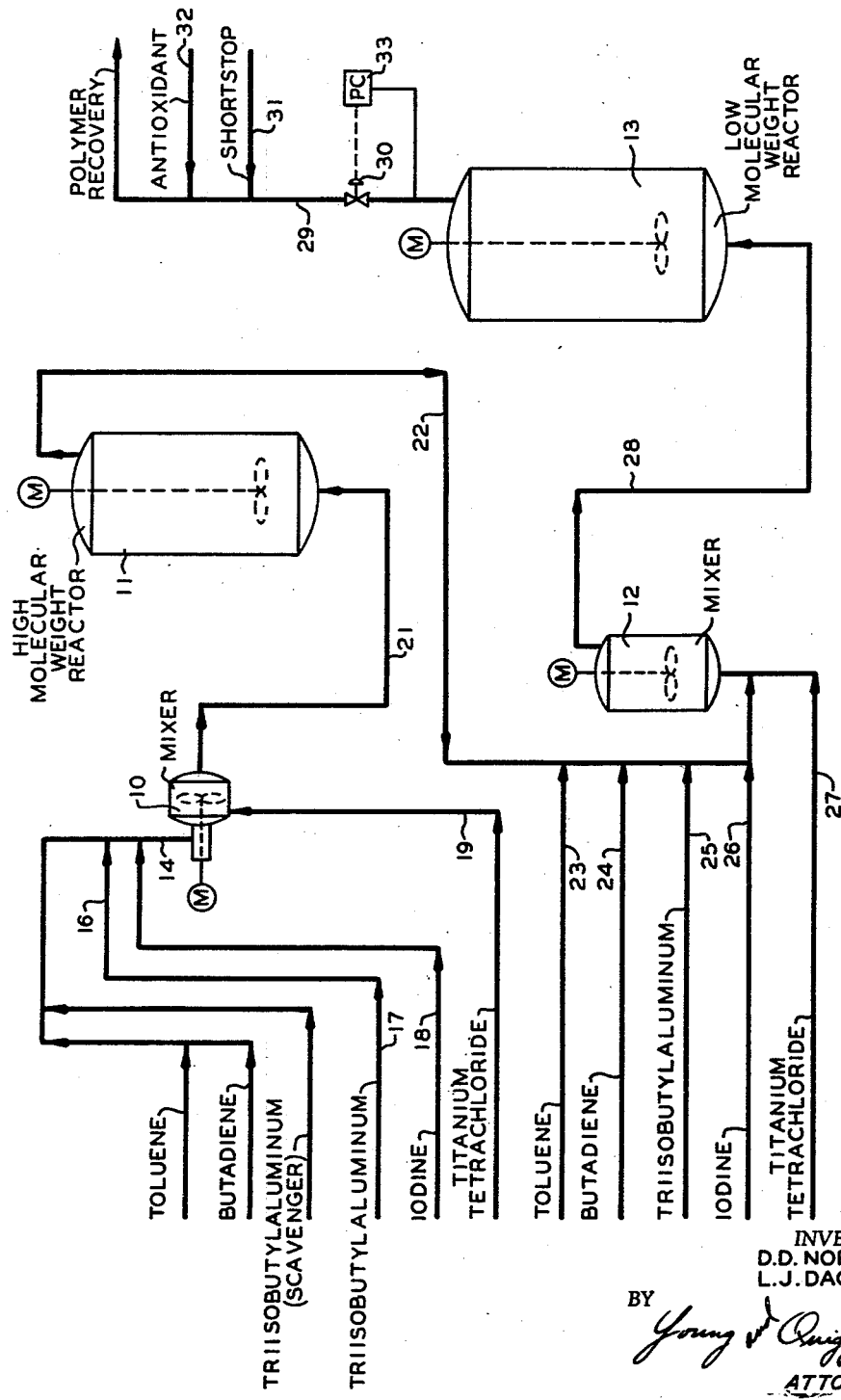

3,189,592
PRODUCTION OF BIMODAL CIS-POLYBUTADIENE
Donald D. Norwood and Leo J. Dagley, Jr., Bartlesville, Okla., assignors to Phillips Petroleum Company, a corporation of Delaware
Filed Aug. 23, 1962, Ser. No. 218,981
5 Claims. (Cl. 260—94.3)

This invention relates to a polymerization process for the production of polymodal cis-polybutadiene.

Among the various new polymers developed from the solution polymerization of conjugated dienes using organometal initiator systems are the high cis polymers of butadiene, polymers formed by 85 to 100 percent cis 1,4-addition. The physical properties of these polymers are such as to make them particularly suitable for heavy duty tires and other articles for which natural rubber has heretofore been preferred.

In the manufacture and processing of these polymers and particularly in their packaging, shipping, and storage, certain difficulties have been encountered from their tendency to cold-flow in the unvulcanized state. For example, in the event of cracks or punctures in a package, polymer flows therefrom, leading to product loss or contamination, sticking together of packages, and the like.

One solution to the problem of cold flow has been the production of cis-polybutadiene having two (bimodal) or more (polymodal) modes or humps in the molecular weight distribution curve. One portion of the polymer should have an inherent viscosity in the range of approximately 6 to 20 with a final polymer in the range of approximately 2 to 5. Preferred products contain 2 to 45 percent by weight of the high inherent viscosity polymer.

An object of this invention is to provide a new polymerization process which produces cis-polybutadiene with reduced tendency to cold-flow. A further object is to provide a continuous process for the production of polymodal cis-polybutadiene. Other objects and advantages will be apparent to one skilled in the art upon reading this disclosure.

Accompanying and forming a part of this disclosure is a drawing comprising a single figure showing a system for the practice of this invention.

Polymodal cis-polybutadienes have been produced by various methods. One of the better methods is that forming the subject matter of the copending application assigned to the assignee of the present application. This is Naylor, Serial No. 153,354, filed November 20, 1961. Briefly, the process of that application is a 2-step process in which the catalyst is added sequentially, a high molecular weight polymer being formed in the first step of the polymerization and a lower molecular weight polymer being formed in the second step. The present process is an improvement thereon. With the initiator systems used for the polymerization of butadiene to produce a polymer having high cis structure, the reaction rate is high during the initial phases of the operation. During this time of high reaction rate minute changes in feed composition or reaction conditions produce a large change in the amount of polymer formed and/or the properties thereof. As the polymerization continues, reaction rate levels off. At about 50 percent conversion, the polymerization becomes considerably slower.

In the present invention, a 2-stage polymerization system is used which is continuous and which takes advantage of the reduction in polymerization rate as the reaction proceeds. In the first stage, the monomer, solvent, and initiator are added, the initiator being used at a level at which a high molecular weight (high inherent viscosity) polymer is produced. The effluent from this first reaction zone is mixed with additional monomer, solvent, and initiator and further reacted in a second polymerization zone. By the addition of more initiator, the total initiator level in the second polymerization zone is maintained at a level at which the low molecular weight (low inherent viscosity) portion of the polymodal product is produced. Polymerization in both stages is regulated by selection of the amounts of the various ingredients at a point such that roughly 50 percent or higher conversion is obtained in each reactor.

More specifically, our invention provides a continuous two-stage polymerization process for the production of polybutadiene in the presence of an initiator obtained by mixing at least one organometal compound as a first component and a second component containing titanium and iodine, comprising continuously introducing 1,3-butadiene, a hydrocarbon diluent, and initiator to a first polymerization zone, the amount of titanium charged to said first zone being in the range of 0.02 to 0.15 gram millimols per 100 grams of butadiene, polymerizing 50 to 80 percent of the butadiene charged in said first polymerization zone, continuously withdrawing a first polymerization effluent from said first polymerization zone, continuously adding additional butadiene, toluene, and initiator to said first effluent, continuously introducing the resulting mixture into a second polymerization zone, the amount of additional initiator being sufficient to provide an amount of titanium in said second polymerization zone of 0.2 to 2 gram millimols per 100 grams of butadiene charged thereto including that charged to said first zone, and continuing polymerization to an overall conversion of 60 to 90 percent, the amount of butadiene being fed to each of said zones being adjusted so that the final polymer product contains 2 to 45 percent by weight of material produced in said first zone. This process results in the production of the high inherent viscosity polymer in the first zone and the low inherent viscosity polymer in the second zone. A particularly useful group of polymer products comprise those in which the final polymer product contains 12 to 40 percent by weight of material produced in said first zone.

The specific steps of the invention can be clearly understood from examination of the drawing to which attention is now directed. The essential components of the system include a preform mixer 10, a Step 1 reactor 11 in which high molecular weight polymer is prepared, a second mixer 12, and a Step 2 reactor 13, in which the low molecular weight portion of the final product is produced. Toluene and butadiene are supplied to mixer 10 by conduit 14. Added to this line is a small amount of triisobutylaluminum which functions as a scavenger through line 16. The amount of scavenger to be added must be determined by experiment, the amount varying with the purity of the solvent and monomer being used. Triisobutylaluminum is supplied by conduit 17 and iodine is supplied by conduit 18, these with the titanium tetrachloride charged directly to mixer 10, by means of conduit 19, functioning as the polymerization initiator. This mixer 10 is provided to insure thorough mixing of the ingredients but no reaction takes place therein because it is relatively small, thereby giving a short residence time. The effluent mixture is passed to reactor 11 by means of conduit 21. The effluent from reactor 11 passes to mixer 12 by means of conduit 22, additional toluene, butadiene, triisobutylaluminum, and iodine being supplied to conduit 22 by means of conduits 23, 24, 25 and 26 respectively. Titanium tetrachloride is added by conduit 27. Mixer 12 is provided to insure good mixing of all of the components. Good mixing at this point is particularly important because the stream contains the high inherent viscosity rubber dissolved therein. The effluent from mixer 12 is passed to reactor 13 by means of conduit 28. The effluent from reactor 13 contains a solution of the two types of polymer in the solvent and this material is removed by conduit 29, this removal being controlled by valve 30 operated by pressure controller 33. Generally, a shortstop and an antioxidant are added to the polymer immediately after removal from the reactor, the addition of these materials being shown by conduits 31 and 32, respectively. The rubber can be recovered from the solution by conventional methods. Steam stripping is one such method.

The class of initiators which can be used to produce polymers having very high amounts of cis configuration have received considerable study. Many different systems have been developed which produce polybutadiene formed by 85 to 100 percent cis 1,4-addition. The polymers can contain small amounts of trans-1,4 and vinyl addition.

Among suitable systems, there can be mentioned (1) an initiator comprising titanium tetraiodide and an organometal compound having the formula $R_mM$ where R is a hydrocarbon group M is selected from the group consisting of aluminum, mercury, zinc, beryllium, cadmium, magnesium, sodium and potassium, and $m$ is equal to the valence of the metal M, said organometal compound being present in an amount of 1 to 20 mols per mol of titanium tetraiodide, (2) an initiator comprising titanium tetrachloride, titanium tetraiodide, and an organometal having the formula $R_mM'$ where R is a hydrocarbon group, M' is selected from the group consisting of aluminum, magnesium, lead sodium and potassium, and $m$ is equal to the valence of the metal M', the mol ratio of titanium tetrachloride to titanium tetraiodide being in the range of 0.05:1 to 5:1, said organometal compound being present in an amount of 1 to 20 moles per mol of titanium tetrachloride plus titanium tetraiodide, (3) an initiator comprising elemental iodine, a compound having the formula $TiX_a$, where X is selected from the group consisting of chlorine and bromine and $a$ is an integer from 2 to 4, inclusive, and an organometal compound selected from the group consisting of $R_3Al$ and $R_2Mg$ where R is a hydrocarbon group, the mol ratio of titanium halide to iodine being in the range of 10:1 to 0.25:1 and said organometal compound being present in an amount of 1 to 20 mols per mol of titanium halide, (4) an initiator comprising a titanium halide having the formula $TiX_4$ where X is selected from the group consisting of chlorine and bromine, an inorganic iodide having the formula $M''I_b$ where M'' is selected from the group consisting of beryllium, zinc, cadmium, aluminum, gallium, indium, thallium, silicon, germanium, tin, lead, phosphorus, antimony, arsenic, and bismuth and $b$ is an integer from 2 to 5 inclusive, and an organometal compound having the formula $R_xM'''$ where R is a hydrocarbon group, M''' is selected from the group consisting of aluminum, gallium, indium, and thallium, and $x$ is equal to the valence of the metal M''', the mol ratio of $TiX_4$ to $M''I_b$ being in the range of 0.05:1 to 5:1 and said organometal compound being present in an amount of 1 to 20 mols per mol of $TiX_4$ plus $M''I_b$, and (5) an initiator comprising titanium tetraiodide, an inorganic halide having the formula $M^{iv}X_c$ where $M^{iv}$ is selected from the group consisting of aluminum, gallium, indium, thallium, germanium, tin, lead, phosphorus, antimony, arsenic, and bismuth, X is selected from the group consisting of chlorine and bromine, $c$ is an integer from 2 to 5, inclusive, and an organometal compound having the formula $R_xM'''$ where R is a hydrocarbon group, and M''' and $x$ are as defined above, the mol ratio of titanium tetraiodide to $M^{iv}X_c$ being in the range of 0.05:1 to 5:1 and said organometal compound being present in an amount of 1 to 20 mols per mol of titanium tetraiodide plus $M^{iv}V_c$, the number of carbon atoms in each R group being up to and including 20. The total amount of titanium used in the system should be in the range of 0.2 to 2 millimols per 100 grams of 1,3-butadiene. In the first step of polymerization, a small amount of initiator is added and this results in the production of a polymer having a high inherent viscosity, preferably in the range of 6 to 20. Thereafter, the balance of the initiator is added and the polymerization continues forming a final product having an inherent viscosity in the range of 2 to 5.

The following are examples of preferred catalyst systems which can be used to polymerize 1,3-butadiene to a cis 1,4-polybutadiene; triisobutylaluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide and iodine; n-amylsodium and titanium tetraiodide; phenylsodium and titanium tetraiodide; n-butylpotassium and titanium tetraiodide; phenylpotassium and titanium tetraiodide; n-amylsodium, titanium tetrachloride and titanium tetraiodide; triphenylaluminum and titanium tetraiodide; triphenylaluminum, titanium tetraiodide and titanium tetrachloride; triphenylaluminum, titanium tetrachloride and iodine; tri-alpha-naphthylaluminum, titanium tetrachloride and iodine; tribenzylaluminum, titanium tetrabromide and iodine; diphenylzinc and titanium tetraiodide; di-2-tolylmercury and titanium tetraiodide; tricyclohexylaluminum, titanium tetrachloride and titanium tetraiodide; ethylcyclopentylzinc and titanium tetraiodide; tri(3-isobutylcyclohexyl) aluminum and titanium tetraiodide; tetraethyllead, titanium tetrachloride and titanium tetraiodide; dimethylphenyllead, titanium tetrachloride and titanium tetraiodide; diphenylmagnesium and titanium tetraiodide; di-n-propylmagnesium, titanium tetrachloride and titanium tetraiodide; dimethylmagnesium, titanium tetrachloride and iodine; diphenylmagnesium, titanium tetrabromide and iodine; methylethylmagnesium, and titanium tetraiodide; dibutylberyllium and titanium tetraiodide; diethylcadmium and titanium tetraiodide; diisopropylcadmium and titanium tetraiodide; triisobutylaluminum, titanium tetrachloride, and antimony triiodide; triisobutylaluminum, titanium tetrachloride and aluminum triiodide; triisobutylaluminum, titanium tetrabromide, and aluminum triiodide; triethylaluminum, titanium tetrachloride, and phosphorus triiodide; tri-n-dodecylaluminum, titanium tetrachloride, and tin tetraiodide; triethylgallium, titanium tetrabromide, and aluminum triiodide; tri-n-butyl aluminum, titanium tetrachloride, and antimony triiodide; tricyclophentylaluminum, titanium tetrachloride, and silicon tetraiodide; triphenylaluminum, titanium tetrachloride, and gallium triiodide; triisobutylaluminum, titanium tetraiodide and tin tetrachloride; triisobutylaluminum, titanium tetraiodide and antimony trichloride; triisobutylaluminum, titanium tetraiodide and aluminum trichloride; triisobutylaluminum, titanium tetraiodide, and tin tetrabromide; triethylgallium, titanium tetraiodide, and aluminum tribromide; triethylaluminum, titanium tetraiodide, and arsenic trichloride; and tribenzylaluminum, titanium tetraiodide, and germanium tetrachloride.

The polymerization process for preparing cis-polybutadiene is carried out in the presence of a hydrocarbon diluent which is not deleterious to the catalyst system. Examples of suitable diluents include aromatic, paraffinic, and cycloparaffinic hydrocarbons, it being understood that mixtures of these materials can also be used. Specific examples of hydrocarbon diluents include benzene, toluene, n-butane, isobutane, n-pentane, isoctane, n-dodecane, cyclopentane, cyclohexane, methylcyclohexane, and the like. It is often preferred to employ aromatic hydrocarbons as the diluent.

The process for preparing cis-polybutadiene can be carried out at temperatures varying over a rather wide range, e.g., from $-100$ to $250°$ F. It is usually preferred to operate at a temperature in the range of $-30$ to $160°$ F.

The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

Various materials are known to be detrimental to the catalyst employed in preparing the cis-polybutadiene. These materials include carbon dioxide, oxygen and water. It is usually desirable, therefore, that the butadiene and the diluent be freed of these materials as well as other materials which may tend to inactivate the catalyst. Furthermore, it is desirable to remove air and moisture from the reaction vessel in which the polymerization is to be conducted. Upon completion of the polymerization reaction, the reaction mixture is then treated to inactivate the catalyst and recover the rubbery polymer. A suitable method for accomplishing this result involves steam stripping the diluent from the polymer. In another suitable method, a catalyst inactivating material, such as an alcohol, added to the mixture so as to inactivate the catalyst and cause precipitation of the polymer. The polymer is then separated from the alcohol and diluent by any suitable means, such as decantation or filtration. It has been found to be advantageous to add an antioxidant, such as phenyl-beta-naphthylamine, 2,2'-methylene-bis(4-methyl-6-tertiary-butylphenol), etc., to the polymer solution prior to recovery of the polymer.

The following examples illustrate operation according to our invention but they should not be considered unduly limiting.

In the examples the cold flow was determined by extruding the rubber through a ¼-inch orifice having a length of 0.107 inch at 3.5 p.s.i. pressure at a temperature of 122° F. After allowing 10 minutes to reach steady state, the rate of extrusion is measured and the value reported in milligrams per minute.

EXAMPLE I

The system shown in the drawing has been used for the production of polymodal cis-polybutadiene. In this operation, reactor 11 (Step 1) was operated at 70° F. and reactor 13 (Step 2) at 40° F. Residence time in the mixer was approximately 28 seconds; in reactor 11, 2.5 hours; in mixer 12, 6.4 minutes, and in reactor 13, 1.5 hours. Conversion was 50 percent in the Step 1 reactor with an overall conversion of 70 percent. Over 85 percent of the polymer was formed by cis 1,4-addition and the product had a cold flow of approximately 2. The material balance for this operation is shown in the following table:

run the product was formed by greater than 85 percent 1,4-addition.

RUN 1
[Recipe, parts by weight]

|  | Step 1 | Overall* |
|---|---|---|
| Butadiene | 100 | 100 |
| Toluene | 1,500 | 1,200 |
| Triisobutylaluminum | 0.0357 (0.18 mhm) | 0.60 (3.04 mhm) |
| Iodine | 0.0399 (0.158 mhm) | 0.224 (0.88 mhm) |
| Titanium tetrachloride | 0.0171 (0.09 mhm) | 0.096 (0.51 mhm) |
| Scavenger (triisobutylaluminum) | 0.14 | |

RUN 2

|  | Step 1 | Overall | |
|---|---|---|---|
|  |  | Run 2A (first 30 hrs.) | Run 2B (next 17 hrs.) |
| Butadiene | 100 | 100 | 100 |
| Toluene | 1,800 | 1,500 | 1,700 |
| Triisobutylaluminum | 0.0298 (0.15 mhm) | 0.730 (3.68 mhm) | 0.700 (3.54 mhm) |
| Iodine | 0.0382 (0.15 mhm) | 0.272 (1.07 mhm) | 0.261 (1.03 mhm) |
| Titanium tetrachloride | 0.0142 (0.075 mhm) | 0.117 (0.62 mhm) | 0.112 (0.59 mhm) |
| Scavenger (triisobutylaluminum) | 0.18 | | |

|  | Run 1 | Run 2A | Run 2B |
|---|---|---|---|
| Total time of run, hours | 38 | 30 | 17 |
| Residence time, hours |  |  |  |
| Step 1 | 2.0 | 2.5 | 2.5 |
| Step 2 | 1.55 | 1.54 | 1.54 |
| Conversion, weight percent: |  |  |  |
| Step 1 | 55 | 60 | 61 |
| Overall | 75 | 85 | 80 |
| Inherent viscosity: |  |  |  |
| Step 1 | 6.1 | 6.2 | 6.5 |
| Overall | 3.2 | 2.5 | 3.0 |
| High molecular weight portion of product, wt. percent | 38 | 29 | 35 |
| Mooney of product (ML-4 at 212° F.) | 30 | 22 | 22 |
| Cold flow | 1.56 | 2.53 | 2.53 |

*Ratio present in Step 2 reactor.

For the inherent viscosity determination, one tenth gram of polymer was placed in a wire cage made from 80 mesh screen and the cage was placed in 100 ml. of toluene contained in a wide-mouth, 4-ounce bottle. After the polymer remained in contact with the solvent for 24 hours at room temperature (approximately 25° C.), the cage was removed and the solution filtered to remove any solid particles present. The resulting solution was run through a Medalia-type viscometer supported in a 25° C. temperature bath. The viscometer was previously calibrated with toluene. The relative viscosity is the ratio

| Conduit | Toluene | Butadiene | Triisobutylaluminum | Iodine | Titanium tetrachloride | High molecular weight rubber | Low molecular weight rubber |
|---|---|---|---|---|---|---|---|
| 14 | 68,400 | 2,360 | 4.2 | 0.9 |  |  |  |
| 19 |  |  |  |  | 0.3 |  |  |
| 21 | 68,400 | 2,360 | 4.2 | 0.9 | 0.3 |  |  |
| 22 | 68,400 | 1,180 | 4.2 | 0.9 | 0.3 | 1,180 |  |
| 23 | 65,200 |  |  |  |  |  |  |
| 24 |  | 6,760 |  |  |  |  |  |
| 25 |  |  | 44.7 |  |  |  |  |
| 26 |  |  |  | 21.2 |  |  |  |
| 27 |  |  |  |  | 9.1 |  |  |
| 28 | 133,920 | 9,120 | 48.9 | 22.1 | 9.4 | 1,180 |  |
| 29 | 133,920 | 3,090 | 48.9 | 22.1 | 9.4 | 1,180 | 6,030 |

EXAMPLE II

Additional runs have also been made and details of some of these are set forth in the following table, the recipes first being given followed by the details of the polymerization and analysis of the products. In each of the viscosity of the polymer solution to that of toluene. The inherent viscosity is calculated by dividing the natural logarithm of the relative viscosity by the weight of the original sample.

To determine the amount of the molecular structure of the various types, the polymers can be dissolved in carbon disulfide to form a solution having 25 grams of polymer per liter of solution. The infrared spectrum of such a solution (percent transmission) is then determined in a commercial infrared spectrometer.

The percent of the total unsaturation present as trans 1,4- is calculated according to the following equation and consistent units:

$$\epsilon = \frac{E}{tc}$$

where: $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction is determined at the 10.35 micron band and the extinction coefficient used is 146 (liters-mols$^{-1}$-centimeters$^{-1}$).

The percent of the total unsaturation present as 1,2- (or vinyl) is calculated according to the above equation, using the 11.0 micron band and an extinction coefficient of 209 (liters-mols$^{-1}$-centimeters$^{-1}$).

The percent of the total unsaturation present as cis 1,4- is obtained by subtracting the trans 1,4- and 1,2- (vinyl) determined according to the above methods from the theoretical unsaturation assuming one double bond per each $C_4$ unit in the polymer.

Operation according to the present invention is particularly satisfactory because it is a simple matter to control conditions in each of the reaction zones. Operation at higher polymerization temperatures somewhat reduces the cis content of the final polymer. This must be balanced against the desire to obtain good conversion rates by using more elevated temperatures. The 70° F. and 40° F. temperatures set forth in Example I provide a good compromise in this matter.

Another variable which is easy to control is the monomer to solvent ratio present in each reactor. In the reactor in which the high molecular weight polymer is produced, the viscosity can reach a limiting factor which interferes with effective heat transfer. When the viscosity in the reactor goes much above 3000 centipoises, heat transfer becomes difficult, although we have worked with viscosities as high as approximately 4000 centipoises. Therefore, as shown by the examples, we prefer to operate with a higher solvent to monomer ratio in the first step of the process and a lower solvent to monomer ratio in the second step. Viscosity control is less difficult where the lower molecular weight polymer is concerned and, this is the polymer which is present to the greatest extent in the effluent from the low molecular weight reactor.

The products produced according to our invention are useful in making tires and other rubber articles. The usual compounding recipes in preparing vulcanized products are used including softeners, filters, and curatures. It is sometimes desirable to blend the polymodal cis-polybutadiene with SBR, natural rubber, and the like.

As many possible embodiments can be made of this invention without departing from the scope thereof, it is to be understood that all matter herein set forth is to be interpreted as illustrative and not as unduly limiting the invention.

We claim:
1. A continuous two-stage polymerization process for the production of polybutadiene containing at least 85 percent cis-1,4,-addition in the presence of an initiator obtained by mixing at least one organometal compound as a first component and a second iodine containing component containing a titanium halide, comprising continuously introducing 1,3-butadiene, a hydrocarbon diluent, and initiator to a first polymerization zone, the amount of titanium charged to said first zone being in the range of 0.02 to 0.15 gram millimols per 100 grams of butadiene, polymerizing 50 to 80 percent of the butadiene charged in said first polymerization zone, continuously withdrawing a first polymerization effluent from said first polymerization zone, continuously adding additional butadiene, toluene, and initiator to said first effluent, continuously introducing the resulting mixture into a second polymerization zone, the amount of additional initiator being sufficient to provide an amount of titanium in said second polymerization zone of 0.2 to 2 gram millimols per 100 grams of butadiene charged thereto including that charged to said first zone, and continuing polymerization to an overall conversion of 60 to 90 percent, the amount of butadiene being fed to each of said zones being adjusted so that the final polymer product contains 2 to 45 percent by weight of material produced in said first zone.

2. The process of claim 1 wherein said first zone is operated at a higher temperature than said second.

3. The process of claim 1 wherein the ratio of butadiene to toluene is higher in said second zone than in said first.

4. The process of claim 1 wherein the final polymer product contains 12 to 40 percent by weight of material produced in said first zone.

5. A continuous two-stage polymerization process for the production of polybutadiene containing at least 85 percent cis-1,4-addition in the presence of a triisobutyl-aluminum-iodine-titanium tetrachloride initiator system, the mol ratio of titanium tetrachloride to iodine being in the range of 10:1 to 0.25:1 and said triisobutylaluminum being present in an amount of 1 to 20 mols per mol of titanium tetrachloride, comprising continuously introducing 1,3-butadiene, toluene, and initiator to a first polymerization zone, the amount of titanium tetrachloride charged to said first zone being in the range of 0.02 to 0.15 gram millimols per 100 grams of butadiene, polymerizing 50 to 80 percent of the butadiene charged in said first polymerization zone, continuously withdrawing a first polymerization effluent from said first polymerization zone, continuously adding additional butadiene, toluene, and initiator to said first effluent, continuously introducing the resulting mixture into a second polymerization zone, the amount of additional initiator being sufficient to provide an amount of titanium tetrachloride in said second zone of 0.2 to 2 gram millimols per 100 grams of butadiene charged thereto including that charged to said first zone, and continuing polymerization to an overall conversion of 60 to 90 percent, the amount of butadiene being fed to each of said zones being adjusted so that the final polymer product contains 2 to 45 percent by weight of material produced in said first zone.

References Cited by the Examiner

UNITED STATES PATENTS

| | | | |
|---|---|---|---|
| 2,999,089 | 9/61 | Short et al. | 260—94.3 |
| 3,057,840 | 10/62 | Pollock | 260—94.3 |

JOSEPH L. SCHOFER, *Primary Examiner.*